United States Patent [19]

Shirai et al.

[11] 4,432,509
[45] Feb. 21, 1984

[54] APPARATUS FOR FEEDING FILM

[75] Inventors: Masanari Shirai, Chigasaki; Hitoshi Yanagawa, Tokyo, both of Japan

[73] Assignee: Canon Kabushiki Kaisha, Tokyo, Japan

[21] Appl. No.: 354,903

[22] Filed: Mar. 4, 1982

[51] Int. Cl.³ .......................... G03B 1/04; G11B 15/32
[52] U.S. Cl. ........................................ 242/195; 226/91
[58] Field of Search .............. 242/192, 195, 186, 187; 226/10–12, 45, 35, 91; 250/571

[56] References Cited

U.S. PATENT DOCUMENTS 3,628,749 12/1971 Ort et al. ............................. 242/186
3,885,756 5/1975 Uehara et al. ...................... 242/195
4,090,680 5/1978 Karsh .................................. 242/195

Primary Examiner—Leonard D. Christian

Attorney, Agent, or Firm—Fitzpatrick, Cella, Harper & Scinto

[57] ABSTRACT

Apparatus for automatically feeding a film to the outside of the reel on which the film has been rolled around. The film has a leader part affixed to the forward end of the film. The width of the leader part is larger than the width of the image recording part of the film. The reel has a pair of flanges disposed spaced from each other by a distance smaller than the width of the leader part. The leader part is rolled around the outer circumference of said paired flanges. A feed roller is provided to feed out the leader part to the outside of the reel. The feed roller has a width smaller than the space between the paired flanges and is movable between a position outside of the paired flanges and a position inside of the flanges. The position of the feed roller is detected by a detector which detects that the whole leader part has been fed out from the reel.

6 Claims, 7 Drawing Figures

APPARATUS FOR FEEDING FILM

BACKGROUND OF THE INVENTION

1. Field of the Invention

The present invention relates to a film feeding apparatus for automatically feeding a film to the outside of the reel on which the film has been rolled round.

2. Description of the Prior Art

Long film sheets, such as microfilm, magnetic tape and movie film (hereinafter these long films are referred to generically as "film"), have difficulties in handling and storage. To overcome these difficulties in these years there has been widely used a so-called cartridge in which a film is received in the form of film roll. Such a cartridge containing a film roll is used in various apparatus, for example, in microfilm reader, magnetic recorder and reproducer, photographing apparatus, projector, etc. In connection with the use of film cartridge in these apparatus, there is an increasing demand for automatic film loading apparatus, automatic film feeding apparatus and the like.

As an automatic film feeding apparatus there has been already known a system in which a film rolled round a reel is fed automatically from the reel to the outside of the reel in the following manner:

A leader part having a larger width than the image recording part of the film is affixed to the forward end of the film. The film is rolled round such a reel which has a pair of flanges spaced from each other by a distance smaller than the width of the leader part. Because of the larger width of the leader part, the winding of the leader part is on the outer circumference of the paired flanges. A feed roller is brought into contact with the winding of the leader part and then driven into rotation. Owing to the frictional contact between the feed roller and the leader part, the latter is fed automatically from the reel to the outside thereof by the rotating feed roller.

In this type of known automatic feed apparatus, the feed roller starts to rotate and is also brought into contact with the winding of the leader part on the flanges of the reel by applying a start instruction. The leader part fed from the reel by the feed roller is guided, for example, to a take-up reel which is also driven into rotation to take up the leader part. After almost all of the leader part has been taken up on the take-up reel, the remaining part of the film is fed from the supply reel solely by the rotation of the take-up reel. Therefore, in this apparatus, the feed roller should be stopped and moved to its retracted position apart from the supply reel in good time after the leader part has been taken up on the take-up reel. In the retracted position, the automatic feed apparatus becomes inactive.

In the known apparatus, in order to retract the apparatus to the inactive position, there has been provided detection means such as a microswitch in the film feeding path. Whether or not any portion of the leader part is present in the feeding path is detected by said detection means such as the microswitch. According to the prior art, the automatic feeding apparatus is retracted to the inactive position when there is no longer present any portion of the leader part to be detected. However, this prior art detection method involves some problems, such as the film is contacted by said detection means such as microswitch and therefore the film is damaged. It has been found that when a film is used employing such a known automatic feeding apparatus for a long time, the film and therefore the images recorded on the film may be finally broken.

Another method provides a take-up detection means for detecting that the leader part has just been taken up on the take-up reel. When it is detected, said detection means issues a signal by means of which the automatic feeding apparatus is retracted to the inactive position. However, this method also has a drawback in that it makes the apparatus very complicated.

SUMMARY OF THE INVENTION

Accordingly, it is a primary object of the present invention to overcome the drawbacks of the prior art apparatus mentioned above.

More specifically, it is an object of the invention to provide a film feeding apparatus which automatically feeds a film without any possibility of damage to the film.

It is another object of the invention to provide a film feeding apparatus in which the automatic film feeding can be controlled without the need of any take-up detection means.

It is a further object of the invention to provide such an apparatus which can control the automatic film feeding operation making use of the movement of a feed roller from a position to another position.

Other and further objects, features and advantages of the invention will appear more fully from the following description of preferred embodiment with reference to the accompanying drawings.

DESCRIPTION OF THE PREFERRED EMBODIMENTS

Figure 1:
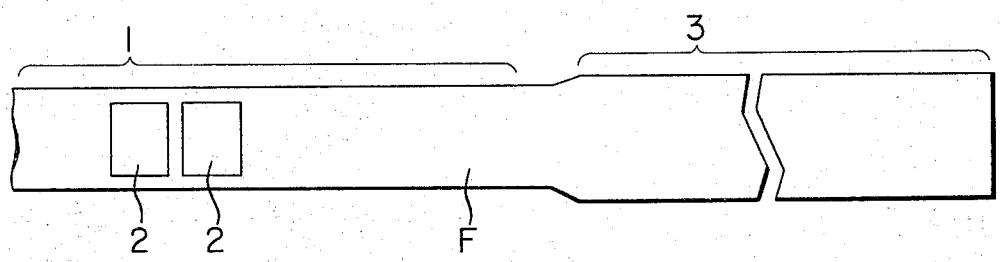
FIG. 1 shows, in plan view, an example of microfilm.
Figure 2:
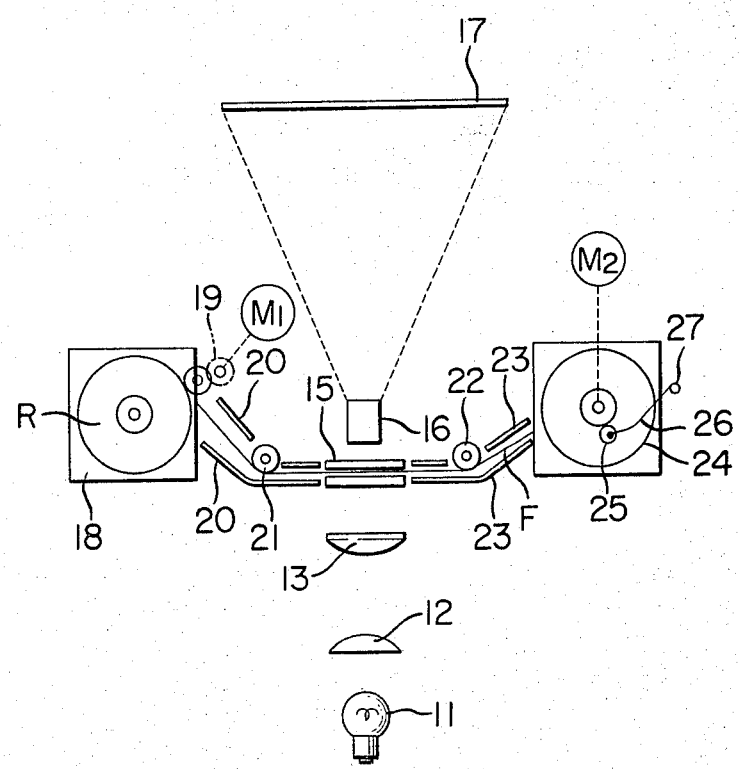
FIG. 2 schematically shows a microfilm reader in which the present invention is embodied.

FIG. 1 shows an example of microfilm generally used in a microfilm reader as shown in FIG. 2.

The microfilm F is composed of two parts, an image part 1 and a leader part 3. The image part has images 2 recorded thereon and the leader part is affixed to the forward end of the image part. The width of the leader part 3 is larger than that of the image part 1 and is stiffer than the latter. The leader part 3 is made of a relatively hard material in the form of tape and is bonded to the forward end of the image part 1 by means of adhesive tape or the like. In the shown example, the width of the image part is 16 mm whereas the leader part 3 is 20 mm in width and 700 mm in length.

FIG. 2 shows a microfilm reader used for reading the microfilm F.

Designated by 11 is an illumination lamp. Through condenser lenses 12 and 13, the light emitted from the lamp 11 is concentrated on the microfilm F sandwiched in between a pair of transparent glass plates 14 and 15. The light transmitted through the film F is projected on a screen 17 through a projection lens 16 to project the images contained in the film on the screen 17.

Designated by 18 is a cartridge containing therein a film reel R on which the microfilm F has been rolled round. 19 is a feed roller used for pulling out the leader part 3 of the microfilm F from the cartridge 18. The feed roller 19 is connected with a motor $M_1$ which is in turn controlled by a start switch as described later. The film F drawn out from the cartridge by the feed roller 19 is then guided to the area of the glass plates 14, 15 through a guide member 20 and a guide roller 21. After passing through between the glass plates 14 and 15, the film is guided to a take-up reel 24 through a guide roller 22 and a guide plate 23. Finally, the film is taken up on the take-up reel 24. The take-up reel 24 is connected with a motor $M_2$ which is in turn controlled by a start switch. 25 is a pinch roller for automatically winding the leading end of the film F on a take-up shaft of the take-up reel 24. A leaf spring 26 supports the pinch roller 25 for rotation. One end of the leaf spring 26 is fixed to a stationary part 27 of the apparatus so that the pinch roller 25 is forcedly pushed against the take-up shaft of the reel 24 by the leaf spring 26.

Figure 3:
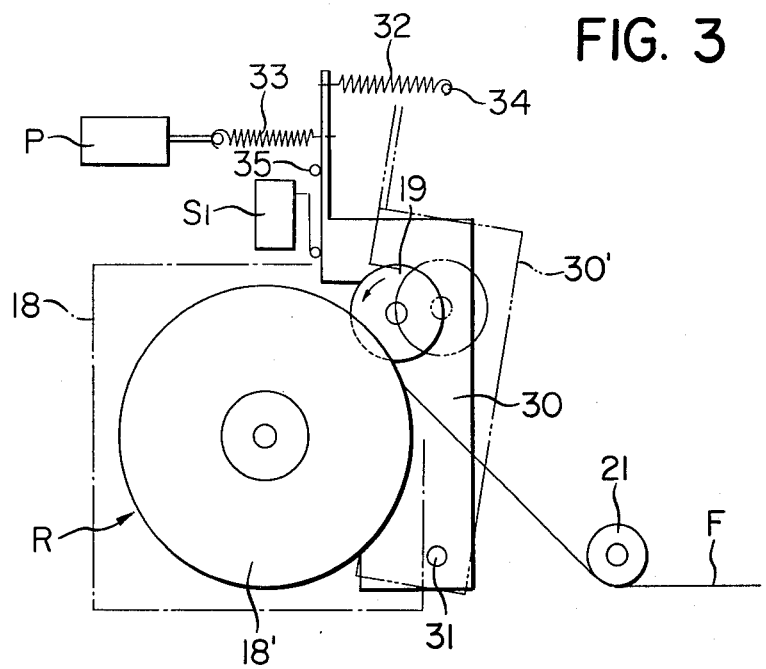
FIG. 3 is a side view of a part of the apparatus showing the mechanism for moving the feed roller.

As shown best in FIGS. 3 and 4, the reel R has a pair of circular flanges 18′, 18′. The distance from flange 18′ to flange 18′ measures $l_1$ which is smaller than the width of the leader part 3 and slightly larger than the width of the image part 1. The width of the feed roller 19 measures $l_2$ which is smaller than the space $l_1$ between the pair of flanges 18′, 18′. The feed roller 19 is formed of a roller having a large coefficient of friction such as rubber roller and is rotatably supported on a supporting member 30. The supporting member 30 is rotatable about a pivot 31 and has coil springs 32 and 33 anchored at the free end. The coil spring 32 extends from the supporting member 30 to a stationary pin 34 and has a biasing force intending to rotate the supporting member 30 about the pivot 31 clockwise. On the other hand, the coil spring 33 is disposed between the supporting member 30 and a solenoid plunger P and has a biasing force biased to rotate the supporting member counter-clockwise.

Figures 4A, 4B:
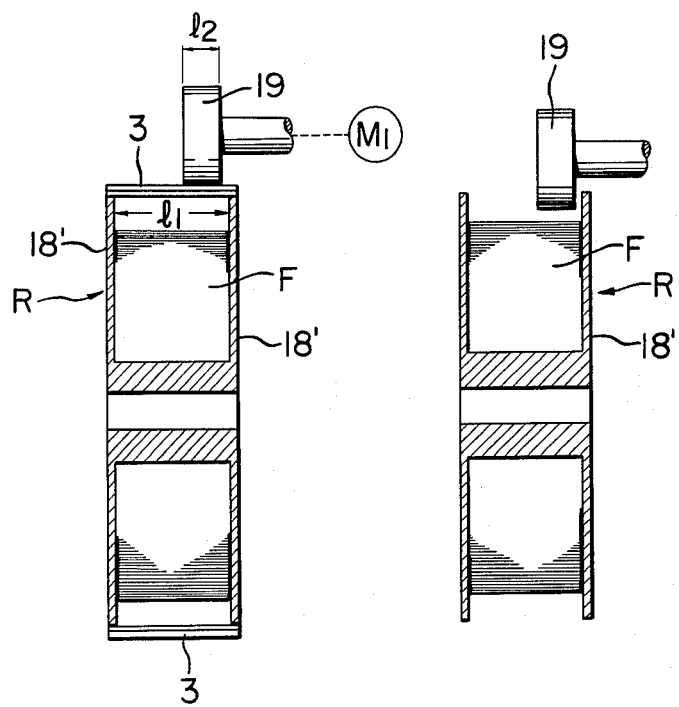
FIGS. 4(A) and 4(B) show the positional relation between the film reel and the feed roller.

When the plunger P is not operating, the supporting member 30 is held in its retracted position suggested by the phantom 30′ under the action of the coil spring 32. In this position of the supporting member, the feed roller 19 is in a first position spaced apart from the flange 18′ of the reel R. When the plunger P is actuated, the supporting member 30 is rotated counter-clockwise about the pivot 31 and therefore the feed roller 19 is moved toward the flange 18′. At the time, if the leader part 3 is still present on the reel R within the cartridge 18, then the feed roller 19 will be forcedly brought into elastic contact with the leader part 3 as shown in FIG. 4(A). However, if the whole leader part 3 has already been drawn out from the cartridge 18, then the feed roller 19 will enter the space between flanges 18′ and 18′ and take a second position as shown in FIG. 4(B). In FIG. 3, the second position of the feed roller 19 is indicated by the solid line.

In FIG. 3, reference numeral 35 depicts a stopper for stopping the supporting member 30 in the position indicated by the solid line. $S_1$ is detection means comprising a microswitch. When the feed roller 19 is moved to the second position, said detection means is contacted with the supporting member to detect the end of the leader part 3.

The manner of operation of the above described apparatus is as follows:

In case that the microfilm F has been rolled round the reel R within the cartridge 18 and the leader part 3 of the microfilm has been received in the cartridge, the leader part 3 is on the outer circumference of the pair of flanges 18′ and 18′ because the leader part is wider than the space between flanges 18′ and 18′ (see FIG. 4A). In this starting position, the plunger P does not operate yet and the supporting member 30 is in the position suggested by the phantom line 30′ in FIG. 3 in which the supporting member 30 can not actuate the microswitch $S_1$. At the start of operation of the plunger P, the supporting member 30 is pivotally moved up to the position in which the feed roller 19 comes into elastic contact with the uppermost winding of the leader part 3. In this position, the supporting member 30 can not yet actuate the leader end detection switch $S_1$.

Actuating the plunger P to bring the feed roller 19 into elastic contact with the leader part 3 in the manner described above, the motor $M_1$ starts to rotate counter-clockwise. Thus, the feed roller starts rotating to draw out the leader part 3 from the cartridge 18 under the frictional action of the feed roller on the leader part. As previously described, the leader part 3 drawn out from the cartridge is moved along the guide members 20 and 23 toward the take-up reel 24 by the aid of guide rollers 21 and 22. The shaft of the take-up reel 24 is connected with the motor $M_2$ which is now rotating clockwise. Therefore, the leader part 3 is taken up on the take-up shaft of the reel 24 automatically by the aid of the pinch roller 25.

As soon as the whole leader part 3 has completely been fed out from the cartridge 13, the feed roller 19 falls into the space between flanges 18′ and 18′ under the action of the coil spring 33 through the supporting member 30 (see FIG. 4B). At this time, the supporting member 30 moves against the microswitch $S_1$ whereby the latter is actuated to detect the passing-over of the end of the leader part 3. In other words, it is detected by the actuation of microswitch $S_1$ so that the whole leader part 3 has just come out from the cartridge 18. In this connection, it is to be understood that even after falling down into the space between flanges 18′ and 18′, the feed roller 19 can not contact with the image part 1 of the microfilm F. The reason for this is that the film F is never rolled round the reel R fully up to the extremity of reel.

When the leader end detection microswitch $S_1$ is actuated in the manner described above, it puts out a signal by means of which the plunger P is made inactive. Therefore, the supporting member 30 together with the feed roller 19 is returned back to the starting position indicated by the phantom 30′ in FIG. 3 under the action of the coil spring 32.

The distance from the cartridge 18 to the take-up reel 24 is usually in the order of 500 mm. However, as previously mentioned, the length of the leader part 3 is about 700 mm (although the length of the leader part may be changed according to the type of the reader then used). Therefore, the forward end of the leader part 3 has already wound up on the take-up reel 24 until the end of the leader part is fed out from the cartridge 18.

As readily understood from the foregoing, the apparatus of the invention automatically feeds a film contained within a cartridge to a take-up reel without any possibility of the image portion of the film being damaged.

Figure 5:
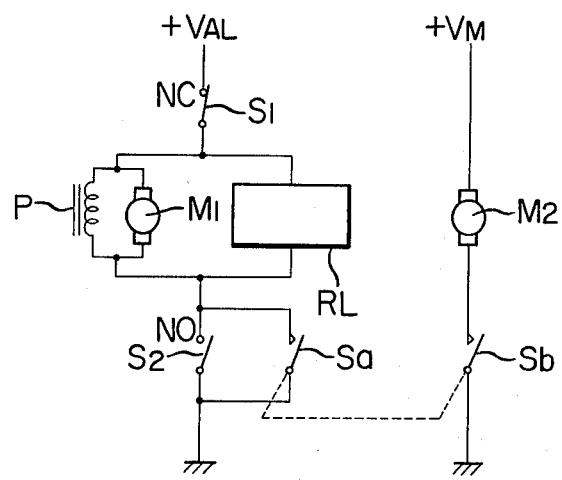
FIG. 5 is a circuit diagram of the film feeding apparatus.

FIG. 5 diagrammatically shows a circuit useful for the above described operation of the apparatus.

By closing the start switch S1 (turn-On), the plunger P and the motor M1 are turned ON, and also a keep relay RL1 connected in parallel with the plunger and motor is turned ON at the same time thereby, a relay holding switch Sa and a motor switch Sb are closed to start the motor M2 rotating. Thus, the take-up reel 24 is driven into rotation and an automatic film feeding is started. Even after the operator releases his finger from the start switch S1 to turn it OFF, the switch Sa holds the relay RL and therefore the automatic film feeding proceeds continuously.

When the end of the leader part 3 comes out from the cartridge 18, the leader end detection switch $S_1$ is opened (turn-Off) thereby, the plunger P, motor $M_1$ and keep relay RL are all cut off from the power source. They, then are out of operation. At the same time, the motor $M_2$ is also brought out of operation. At this time point, the film is stopped and the automatic film feeding is terminated. Thereafter, the operator can carry out feeding of film to find out any desired information contained in the film. The film feed control circuit useful for this purpose is well known in the art, and therefore need not be described herein. It is possible to modify the above embodiment in such a manner that the motor $M_3$ is not stopped but can continue rotating after the turn-Off of the switch $S_1$. In this modification, the take-up reel continues rotating even after the turn-Off of the switch S, and therefore the selection of the desired information recorded on the film may be carried out during the time.

Figure 6:
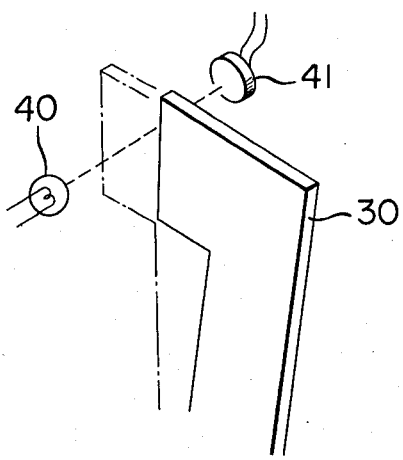
FIG. 6 is a perspective view showing another embodiment of detection means.

FIG. 6 shows another embodiment of leader end detection means.

In this embodiment, a lamp 40 and a photo receptor element 41 constitute end detection means. The light path extending from the lamp 40 to the photo element 41 is closed and opened according to the position of the supporting member 30. In case of the shown embodiment, the feed roller 19 is brought into the second position mentioned above when the supporting member 30 is moved from the position indicated by the solid line to the position indicated by the phantom line. At the time, the light running from the lamp 40 towards the photo element 41 is cut off by the supporting member 30 and a leader end detection signal is issued from the photo element 41. Of course, there may be used various other detection means.

While the invention has been particularly shown and described with reference to preferred embodiments thereof, it will be understood by those skilled in the art that the foregoing and other changes in form and details can be made therein without departing from the spirit and scope of the invention.

We claim:

1. An apparatus for automatically feeding a sheet from a reel on which the sheet is wound, wherein the sheet has a leader part affixed to the leading end of a part of said sheet on which an information is recorded with the leader part having a width larger than that of the information recorded part, said apparatus comprising:

a reel having a core and having a pair of flanges provided on the core spaced apart from each other by a distance which is smaller than the width of the leader part but larger than the width of the information recorded part, the information recorded part being wound around the core and the leader part being wound around the peripheral surface of the pair of flanges;

a roller having a width smaller than the distance between the pair of flanges and movable between a first position spaced from the peripheral surface of the flanges and a second position located between the inner walls of the pair of flanges;

driving means for rotating said roller when the sheet is fed out;

first means for moving said roller, when the sheet is fed out, from the first position to a position where said roller press-contacts the leader part wound around the peripheral surface of the pair of flanges, and then for moving said roller, when the leader part is completely fed out and is spaced from the peripheral surface of the flanges, from the press-contacts position to the second position;

detecting means for outputting a signal which represents the completion of the feeding of the leader part when said roller moves to the second position; and second means for moving said roller to the first position when the sheet feeding operation has been completed.

2. An apparatus according to claim 1, wherein said reel is rotatably contained in a cartridge having an opening for drawing out the leading end of the sheet and for receiving said roller.

3. An apparatus according to claim 1, wherein said first and second moving means include a coil spring.

4. An apparatus according to claim 1, wherein said roller is held by a rockable retaining member and is movable between the first and second positions by the rocking motion of the retaining member, and said detection means detects the position of said retaining member.

5. An apparatus according to claim 1, wherein said driving means is actuated when the sheet feeding operation is initiated, and is stopped by the output of said detecting means.

6. An apparatus for automatically loading a sheet at a predetermined position from a reel on which the sheet is wound, wherein the sheet has a leader part affixed to the leading end of a part of the sheet on which an information is recorded with the leader part having a width larger than that of the information recorded part, said apparatus comprising:

a reel having a core and having a pair of flanges provided on the core spacing apart from each other by a distanced which is smaller than the width of the leader part but larger than the width of the information recorded part, the information recorded part being wound around the core and the leader part being wound around the peripheral surface of the pair of flanges;

a roller having a width smaller than the distance between the pair of flanges and movable between a first position spaced from the peripheral surface of the pair of flanges and a second position located between the inner walls of the pair of flanges;

driving means for rotating said roller to provide an automatic loading operation;

means for guiding the sheet fed out from said reel to the predetermined position;

means for moving said roller, during the automatic loading operation, from the first position to a position where said roller press-contacts the leader part wound around the peripheral surface of the pair of flanges, and then for moving said roller, when the leader part is completely fed out and spaced from the peripheral surface of the pair of flanges, from the press-contacts position to the second position;

detecting means for outputting a signal when said roller moves to the second position;

means for moving said roller to the first position in response to the output of said detecting means; and means disposed at the predetermined position for taking up the sheet fed from said reel.

* * * * *

UNITED STATES PATENT AND TRADEMARK OFFICE
CERTIFICATE OF CORRECTION

PATENT NO. : 4,432,509
DATED : February 21, 1984
INVENTOR(S) : MASANARI SHIRAI, et al.

It is certified that error appears in the above-identified patent and that said Letters Patent is hereby corrected as shown below:

On the title page insert

--[30] Foreign Application Priority Data
Mar. 20, 1981 [JP] Japan.............56-40901--;

On the title page, Abstract, line 8, "around" should read --round--.

Column 6, line 50 (Claim 6), "distanced" should read --distance--.

*Signed and Sealed this*

*Twentieth* Day of *November 1984*

[SEAL]

*Attest:*

GERALD J. MOSSINGHOFF

*Attesting Officer*    *Commissioner of Patents and Trademarks*